United States Patent [19]

Hachitani et al.

[11] Patent Number: 4,757,791
[45] Date of Patent: Jul. 19, 1988

[54] SPEED-GOVERNING APPARATUS FOR INTERNAL COMBUSTION ENGINE

[75] Inventors: Shuji Hachitani, Anjo; Hidetoshi Doshita, Okazaki, both of Japan

[73] Assignee: Nippondenso Co., Ltd., Kariya, Japan

[21] Appl. No.: 16,206

[22] Filed: Feb. 18, 1987

[30] Foreign Application Priority Data

Feb. 19, 1986 [JP] Japan .................................. 61-32910

[51] Int. Cl.⁴ ............................................. F02M 39/00
[52] U.S. Cl. .................................... 123/357; 123/373; 123/494
[58] Field of Search ............... 123/357, 358, 359, 494, 123/373

[56] References Cited

U.S. PATENT DOCUMENTS

| | | | |
|---|---|---|---|
| 3,757,750 | 9/1973 | Ohani | 123/357 |
| 4,393,835 | 7/1983 | Eheim | 123/357 |
| 4,425,889 | 1/1984 | Hachitani | 123/357 |
| 4,495,914 | 1/1985 | Ishii | 123/357 |
| 4,523,562 | 6/1985 | Schapper | 123/357 |

FOREIGN PATENT DOCUMENTS

| | | | |
|---|---|---|---|
| 3512221 | 10/1985 | Fed. Rep. of Germany | 123/357 |
| 0119923 | 9/1980 | Japan | 123/357 |
| 0165530 | 9/1983 | Japan | 123/357 |
| 60-216034 | 10/1985 | Japan | 123/357 |

Primary Examiner—Carl Stuart Miller
Attorney, Agent, or Firm—Cushman, Darby & Cushman

[57] ABSTRACT

A control rack for driving the fuel injection quantity control member of an injection pump which supplies fuel to a diesel engine is driven by a magnetic actuator mechanism. The position of the control rack is transmitted to a position sensor via a tie bar which is pivotally supported by a support shaft. The sensor detects a signal corresponding to an actual amount of fuel to be injected. The support shaft is supported by a control member which is pivotally supported. The control member sets a reference position of the support shaft, and hence, sets the relative positional relationship between the control rack and the position sensor. A portion of the control member extends outside a housing, so that the reference position of the tie bar can be corrected outside the housing. The actuator mechanism is controlled by an instruction from a control circuit which calculates an optimal amount of fuel to be injected. A detection signal from the position sensor is used as a feedback signal for calculating an optimal quantity of to be injected.

16 Claims, 5 Drawing Sheets

SPEED-GOVERNING APPARATUS FOR INTERNAL COMBUSTION ENGINE

BACKGROUND OF THE INVENTION

The present invention relates to a speed-governing apparatus for an internal combustion engine, in particular, a diesel engine, for controlling the number of revolutions thereof and, more particularly, relates to a speed-governing apparatus for setting the amount of fuel to be injected by a fuel injection pump of a diesel engine, based on an electrical instruction.

In a diesel engine, a predetermined amount of metered fuel is supplied to a fuel injection valve, one of which is provided for each of a plurality of cylinders of the engine. The metered fuel is injected from each fuel injection valve into the engine.

In this case, the control function for setting the amount of fuel to be injected is carried out on the basis of an instruction corresponding to the prevailing engine conditions, for example, the number of revolutions per minute (engine RPM) the amount of intake air, and the like.

Such fuel injection quantity control is performed in accordance with a calculated result indicating an optimal amount of fuel to be injected, arrived at on the basis of detection signals supplied by engine condition-detecting means, such as an engine RPM sensor, an intake air quantity sensor, and the like, incorporated in the diesel engine. Stated more precisely, the injection quantity control member of the fuel injection pump is driven in accordance with an electrical signal corresponding to the above-mentioned calculated result. Means considered as being suitable for driving the injection quantity control member include an electromagnetic actuator mechanism, and an electrical control means in the form of a combination of the actuator mechanism and a hydraulic mechanism.

In the course of performing fuel injection quantity control, the position of the injection quantity control member corresponds to the amount of fuel to be injected. The position of the control member is detected by using an electrical type position detector, feedback control for positioning the control member being performed on the basis of this detection signal.

When fuel injection quantity control is to be executed, the relationship between the position of the control member and the amount of fuel to be injected, as well as the relative positional relationship between the control member and the position detector, must be accurately determined. However, in practice, it is difficult to assemble the engine so as to precisely set the relative positional relationship between the control member and the position detector. In addition, it is difficult to determine if the detection signal from the position detector accurately represents the actual amount of fuel to be injected.

SUMMARY OF THE INVENTION

It is an object of the present invention to provide a speed-governing apparatus for an internal combustion engine, which can detect, with great accuracy, the movement of the injection quantity control member of a fuel injection pump, which meters and supplies fuel to an injection valve by means of an electrical type position-detection means, and can electronically perform fuel injection quantity control with a high degree of precision.

It is another object of the present invention to provide a speed-governing apparatus for an internal combustion engine, in which the relative positional relationship between the injection quantity control member of a fuel injection pump and a position-detecting means therefor can be easily set with high precision, whereby a detection signal supplied by the position detecting means thus accurately represents the position of the injection quantity control member.

It is yet another object of the present invention to provide a speed-governing apparatus for an internal combustion engine, in which an accurate and reliable signal representing an optimal amount of fuel to be injected can be obtained from the means for detecting the position of the fuel injection quantity control member, and the engine RPM of, for example, a diesel engine can be electronically controlled with high precision.

More specifically, in an engine speed-governing apparatus according to the present invention, the injection quantity control member of a fuel injection pump is driven by an electromagnetic mechanism which is activated in response to a signal corresponding to an optimal amount of fuel to be injected, calculated on the basis of prevailing engine conditions. The movement of the control member is transmitted to a position-detecting means via a coupling member. A detection signal supplied by the position-detecting means is used as an actual injection quantity signal, and fuel injection quantity control is then executed on the basis of this signal. The coupling member has a reference position which can be changed by a correcting member capable of being externally operated. The relative positional relationship between the injection quantity control member and the position detecting means can be varied in accordance with the reference position of the coupling member. The correcting member can be appropriately fixed in position after the reference position of the coupling member has been set.

In the engine speed-governing apparatus having the above arrangement, an optimal amount of fuel to be injected is calculated by a control circuit comprising, for example, a microcomputer, and the fuel injection quantity control member is driven on the basis of calculated result, whereby its position is set accordingly. The degree of movement of the control member is transmitted to the position-detecting means via the coupling member. On the basis of this movement, the position-detecting means supplies a detection signal corresponding to the actual amount of fuel to be injected. In this case, the reference position of the coupling member can be varied by the correcting member. The relative positional relationship between the injection quantity control member and the position-detecting means is corrected and set by the correcting member, and a highly accurate injection quantity signal can be obtained from the position-detecting means. When the correcting member is operated on the basis of the actual amount of fuel to be injected and the detection signal supplied by the position-detecting means, highly precise and reliable electronic speed-governing control of the internal combustion engine can be realized.

DETAILED DESCRIPTION OF THE PREFERRED EMBODIMENTS

Figure 1:
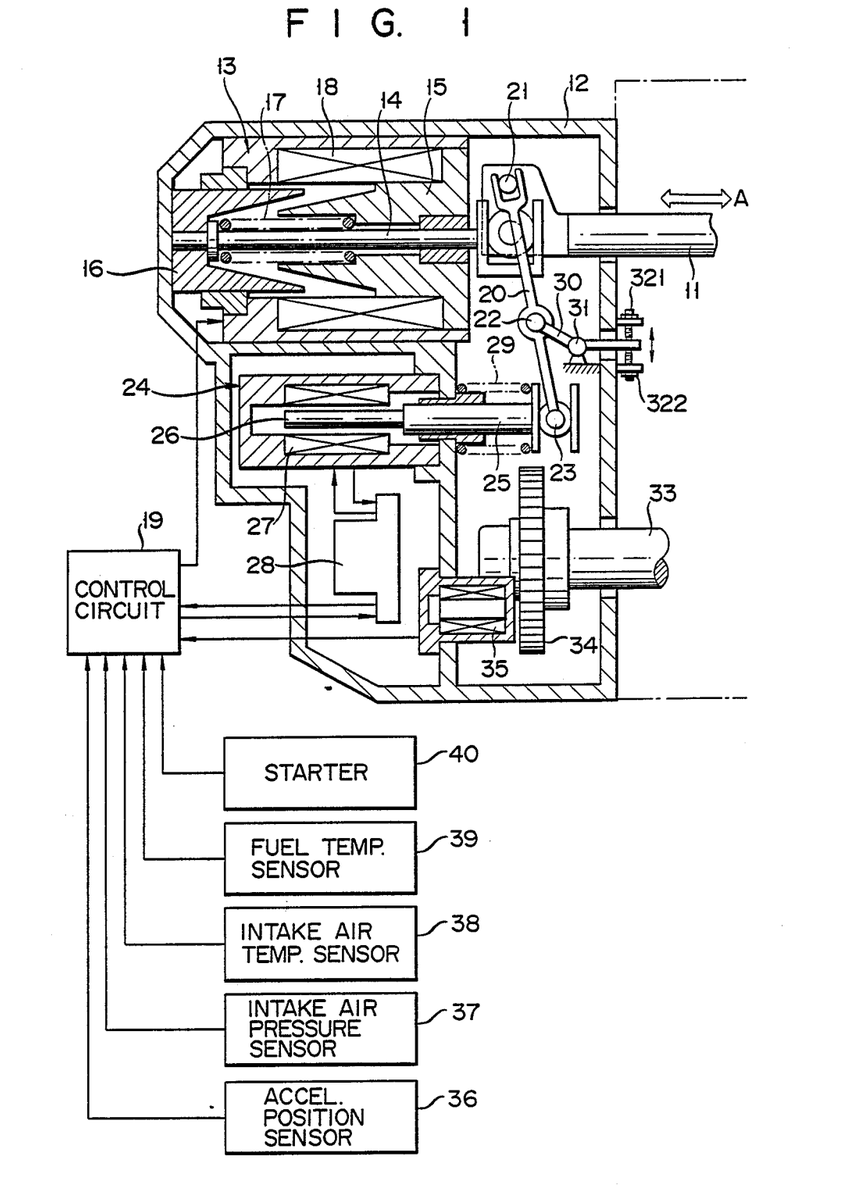
FIG. 1 is a sectional view for explaining a speed-governing apparatus for an internal combustion engine according to a first embodiment of the present invention.

FIG. 1 shows the arrangement of speed-governing apparatus 10 for controlling the amount of fuel to be supplied by a fuel injection pump to, for example, a diesel engine. Speed-governing apparatus 10 comprises control rack 11 which is coupled to a fuel injection control section of a Bosch-type fuel injection pump (not shown). Control rack 11 serves as a fuel injection quantity control member, which is linearly moved as indicated by an arrow in FIG. 1, so that the quantity of fuel to be injected is set in correspondence with its position.

Control rack 11 can be positioned inside housing 12 of apparatus 10. Magnetic actuator mechanism 13 is arranged in housing 12. Control rack 11 is coupled to tie rod 14 of actuator mechanism 13, by means of a pin.

Tie rod 14 can be inserted via a through hole formed in the central portion of stator core 15 of actuator mechanism 13. Moving core 16 is mounted on the distal end portion of control rack 11.

Spring 17 is interposed between stator core 15 and moving core 16, so that a biasing force is applied in the direction in which moving core 16 is separated from stator core 15.

Excitation coil 18 is arranged on the outer peripheral portion of stator core 15. An excitation current selectively flows through coil 18. When the excitation current flows, a magnetic attraction force is produced between cores 15 and 16, and moving core 16 is attracted and driven in the direction of stator core 15, against the biasing force of spring 17. In this case, the moving distance of moving core 16 is determined by the excitation current flowing through excitation coil 18. The excitation current is controlled by electronic control circuit 19, which comprises, for example, a microcomputer.

One end of tie bar 20 is pivotally coupled to control rack 11 by means of pin 21. Tie bar 20 is pivotally supported by support shaft 22 with which a reference position is set. The other end of tie bar 20 is coupled to tie rod 25 of position sensor 24, by means of pin 23.

More specifically, tie rod 25 of position sensor 24 and tie rod 14 of actuator mechanism 13 are coupled via a coupling member constituted by tie bar 20. When tie rod 14 is moved in the direction indicated by arrow A, tie rod 25 is moved in the opposing direction, and the moving distance of tie rod 25 is in proportion to that of tie rod 14. In this case, the relative positional relationship between tie rods 14 and 25 is determined by the position of support shaft 22 of tie bar 20.

Position sensor 24 is constituted by core 26 coaxially coupled to tie rod 25, and induction coil 27 fixed to the outer peripheral portion of core 26. The impedance of coil 27 changes in correspondence with the position of core 26 which is moved integrally with tie rod 25. Therefore, an electrical signal corresponding to the position of core 27 is detected by detector 28.

The position of tie rod 25 is set in correspondence with the position of tie rod 14 which is moved together with control rack 11. Since control rack 11 drives the member for controlling the amount of fuel to be supplied by the fuel injection pump, the signal detected by detector 28 represents the actual fuel amount. The signal supplied by detector 28 is then passed on to control circuit 19.

The biasing force of spring 29 acts on tie rod 25. Spring 29 biases against the electromagnetic force of actuator mechanism 13. Thus, the movement of actuator mechanism 13 can be accurately transmitted to position sensor 24.

Support shaft 22 of tie bar 20 is supported by one end portion of control member 30, and its reference position is set by member 30. Control member 30 is pivotally supported by stationary shaft 31. The other end of member 30 extends outside housing 12, through an opening formed in housing 12, and is clamped by a pair of adjusting screws 321 and 322, so that its position in the pivotal direction is set.

More specifically, when the pivot angle position of control member 30 is changed by adjusting screws 321 and 322, the position of support shaft 22 of tie bar 20 is changed, and hence, the relative positional relationship between tie rods 14 and 25 is changed. Therefore, the reference position of the pivot of tie bar 20 is changed. Control member 30, which supports support shaft 22, constitutes the means for correcting the relative positional relationship between position sensor 24 and actuator mechanism 13; i.e., the injection quantity control member. The correcting means is used for correcting the detecting signal supplied by position sensor 24.

Rotating shaft 33 is inserted in housing 12. Rotating shaft 33 is coupled to a crankshaft (not shown) of the diesel engine, and rotates in correspondence with the prevailing engine speed. Rotating shaft 33 serves as a camshaft for the fuel injection pump (not shown), and gear 34 formed of a magnetic material is integrally mounted on shaft 33 inside housing 12. Pickup 35 is fixed on the outer peripheral portion of gear 34 and adjacent to the teeth of gear 34. Pickup 35 produces a pulse signal for counting the teeth of gear 34 when it rotates. More specifically, pickup 35 produces a pulse signal having a cycle corresponding to the engine speed. The pulse signal representing the engine speed is supplied to control circuit 19 as an engine speed-detection signal.

Control circuit 19 comprises a microcomputer, and receives the engine speed-detection signal, as well as detection signals from accelerator position sensor 36, intake air pressure sensor 37, intake air temperature sensor 38, fuel temperature sensor 39, and the like, and a starter signal from starter 40. Control circuit 19 calculates the optimal amount of fuel to be injected, corresponding to the detected engine condition, based on these input signals. Control circuit 19 controls the excitation current of actuator mechanism 13, based on an injection quantity signal corresponding to the calculated result, so that a given amount of fuel corresponding to the result is supplied and injected into the engine. The fuel injection quantity is detected by position sensor 24, with reference to the movement of tie rod 25 which is driven in correspondence with the movement of injection quantity control member 42. The detection signal from sensor 24 is supplied to control circuit 19.

Figure 2:
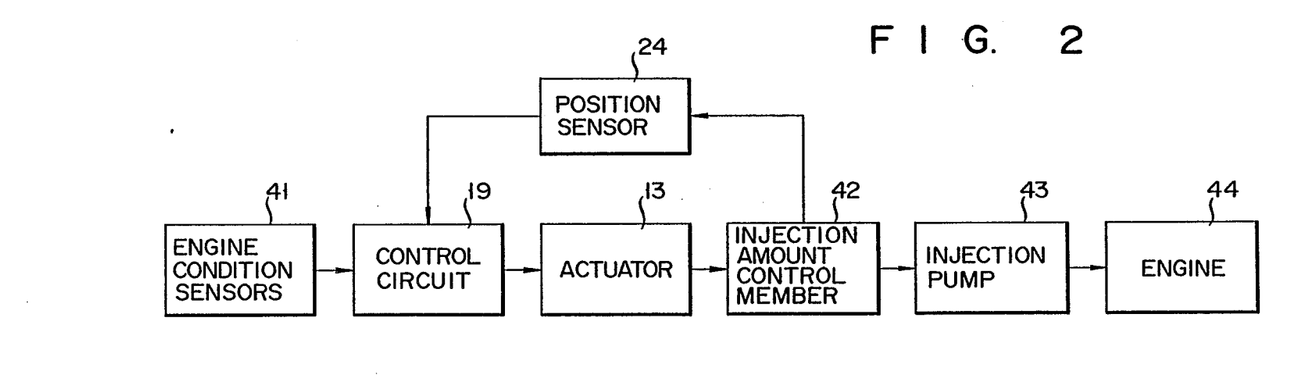
FIG. 2 is a block diagram for explaining an operation control state of the speed-governing apparatus.

FIG. 2 shows the arrangement of an engine control means, using the above-mentioned speed-governing apparatus, which comprises engine condition sensors 41. Engine condition sensors 41 are constituted by various sensors, as is shown in FIG. 1, and detection signals relating to accelerator position, engine speed, various temperatures, and the like, can be obtained therefrom. The detection signals from sensors 41 are supplied to control circuit 19.

Control circuit 19 calculates an optimal amount of fuel to be injected, on the basis of the detection signals, and controls actuator mechanism 13 in accordance with the calculated result. Actuator mechanism 13 drives injection quantity control member 42 via control rack 11, and control member 42 controls the amount of fuel to be supplied to fuel injection pump 43. In this way, the appropriate amount of fuel can be injected into the engine.

The movement of control member 42 is detected by position sensor 24, and the detection signal therefrom is supplied, as a feedback control signal, to control circuit 19.

Figure 3A:
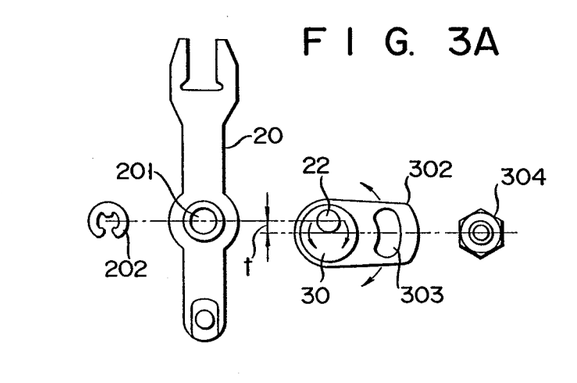
FIG. 3A is an exploded front view showing, in particular, a portion of another embodiment of a position-correcting means which could be incorporated in the apparatus shown in FIG. 1.
Figure 3B:
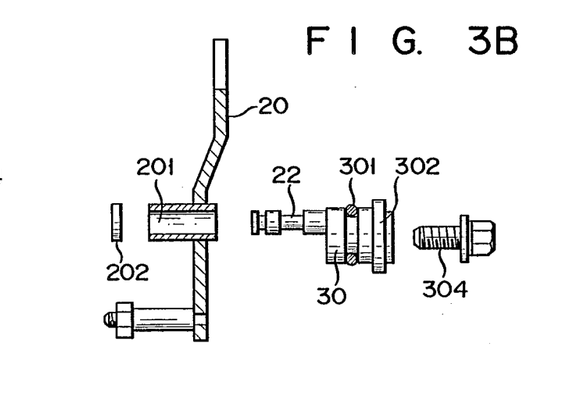
FIG. 3B is a partially cutaway, exploded, side view of the position-correcting means shown in FIG. 3A.

FIGS. 3A and 3B show in detail another embodiment which the correcting means could take, including tie bar 20, and control member 30 supporting support shaft 22 of bar 20. Support shaft 22 is inserted through shaft hole 201 formed in tie bar 20. Support shaft 22 is fixed in position by circular clip 202 while being inserted through shaft hole 201, and tie bar 20 is pivotally supported by support shaft 22.

Control member 30 has a columnar shape. Support shaft 22 projects from one end face of control member 30, at a position eccentric from its central axis position by distance t.

Control member 30 is fitted in an opening formed in housing 12, so as to be oil-tightly sealed by O-ring 301. Control member 30 is pivotally arranged, and an end portion opposite to the surface from which support shaft 22 projects extends outside housing 12.

Flat adjusting member 302 is integrally mounted on the end face portion of control member 30 which is positioned outside housing 12. Adjusting member 302 projects from one side portion of columnar control member 30. Elongated opening 303 is formed in the projecting portion, in correspondence with an arc which is concentrical with the center axis of control member 30. Tightening screw 304 is fitted in opening 303, so that adjusting member 302 is fixed to housing 12.

More specifically, when adjusting member 302 is pivoted while screw 304 is loose, control member 30 is pivoted, and support shaft 22 is pivoted about the pivot shaft of control member 30. Therefore, the pivot position of tie bar 20 can be changed. When the reference position of support shaft 22 of tie bar 20 is determined in this manner, screw 304 is tightened to fix the reference position.

More specifically, when adjusting member 302 is pivoted counterclockwise, support shaft 22 is also pivoted counterclockwise along the arc having radius t. For this reason, tie bar 20, supported by support shaft 22, is pivoted about pin 21 of control rack 11, as indicated by the broken lines in FIG. 4, and the position of core 26 of position sensor 24 can be changed.

Figure 4:
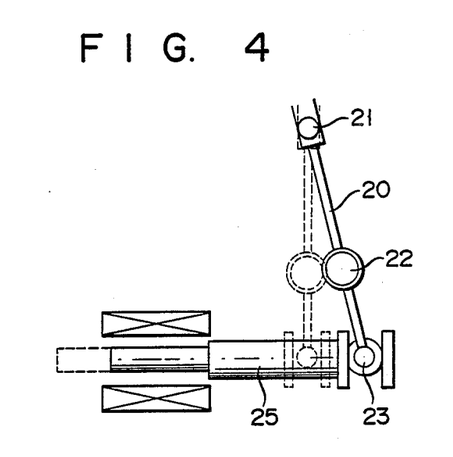
FIG. 4 is a view for explaining the correcting state of the correcting means.

When control rack 11 is located at a specific position, the position of core 26 of position sensor 24 can be adjusted upon pivotal movement of adjusting member 302, and a position-detection signal from position sensor 24, corresponding to the position of control rack 11, can be adjusted.

Figure 5:
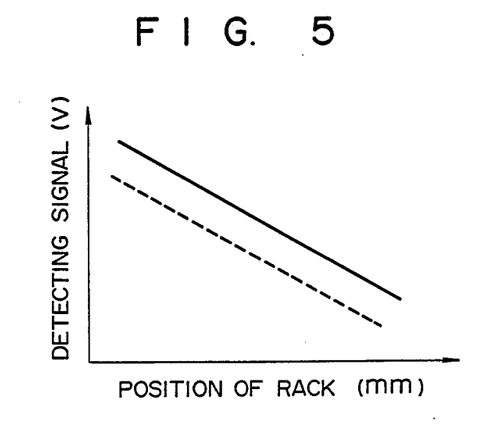
FIG. 5 is a view showing the relationship between the positions of a control rack and a detecting signal from a position sensor, according to a correction made by the position-correcting means.

FIG. 5 shows a state wherein the position of control rack 11 is fixed as shown in FIG. 4, i.e., it shows the state of the detecting signal from position sensor 24 when the position of support shaft 22 of tie bar 20 is set in the states indicated by solid and broken lines, respectively.

When the detecting sensitivity of position sensor 24 incorporated in the speed-governing apparatus varies, or when the relative positional relationship between actuator mechanism 13 and position sensor 24 varies upon assembly, an error is present between the position of control rack 11 corresponding to the actual amount of fuel to be injected and the position-detection signal. Therefore, highly precise fuel injection quantity control cannot be achieved. The prior art corrects such an error inside the control circuit. However, by correcting in this way it is very difficult to improve the control precision. It has also been proposed to adjust the relationship between the position of control rack 11 and the output signal from position sensor 24, by using a shim upon assembly. However, it is difficult to achieve highly precise adjustment by use of such adjusting means, and the precision of fuel injection quantity control cannot be improved.

Referring to the apparatus shown in this embodiment after assembly of the speed-governing apparatus, the relationship between control rack 11 and the detection signal from position sensor 24 can be adjusted outside housing 12. Therefore, easy adjustment is allowed, so that feedback control of the amount of fuel to be injected can be performed with a high degree of precision.

Figure 6:
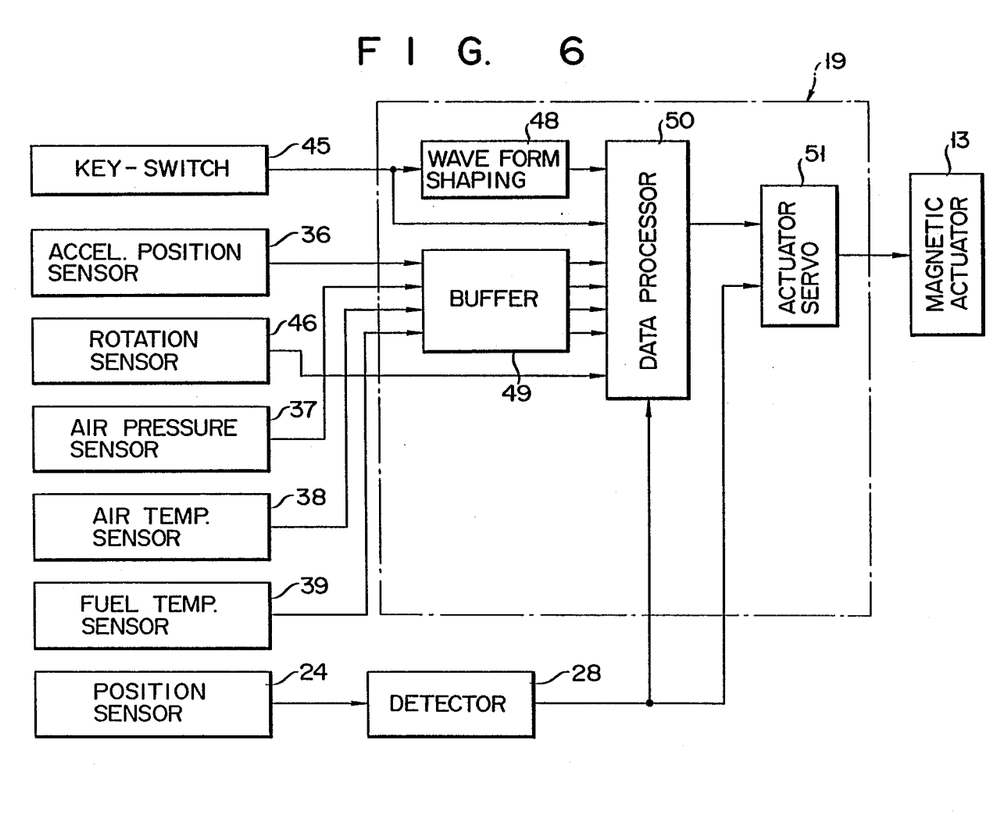
FIG. 6 is a block diagram showing the control circuit of the speed-governing apparatus.

FIG. 6 shows the arrangement of control circuit 19. Control circuit 19 receives the detection signals supplied by accelerator position sensor 36, intake air pressure sensor 37, intake air temperature sensor 38, and fuel temperature sensor 39, and also receives a detection signal from key switch 45 corresponding to the activation control of the starter. Control circuit 19 also receives a detection signal from rotation sensor 46 which comprises pickup 35, as well as one from position sensor 24.

The signal from key switch 45 is wave-shaped by waveform-shaping circuit 48. The accelerator position signal, the intake air pressure signal, the intake air temperature signal, and the fuel temperature signal are supplied to buffer 49. Output signals from circuit 48 and buffer 49 are supplied to data processor 50 which comprises a microcomputer. An output signal from data processor 50 is supplied to actuator servo 51, and an output signal therefrom is used to control actuator mechanism 13.

In this case, the output signal from detector 28, which receives the signal from position sensor 24, is supplied to data processor 50, as a result of of the actual driving operation of actuator mechanism 13, i.e., a signal representing the actual amount of fuel to be injected. This input signal is compared with an instruction signal output from processor 50 to servo 51. Feedback control is performed so that the instruction signal precisely coincides with the actual amount of fuel to be injected amount.

More specifically, data processor 50 calculates an optimal target fuel injection quantity, on the basis of the input detection signals, and hence, calculates a target position for actuator mechanism 13, which corresponds to this target injection quantity. The target position is compared with the actual position signal from detector 28, and actuator servo 51 is controlled in correspondence with the difference therebetween. Thus, the excitation current supplied to excitation coil 18 of actuator mechanism 13 is controlled by servo 51. As a result, control rack 11 is driven to coincide with the target position, and the amount of fuel supplied to fuel injection pump 43 is set at the target value.

Figure 7:
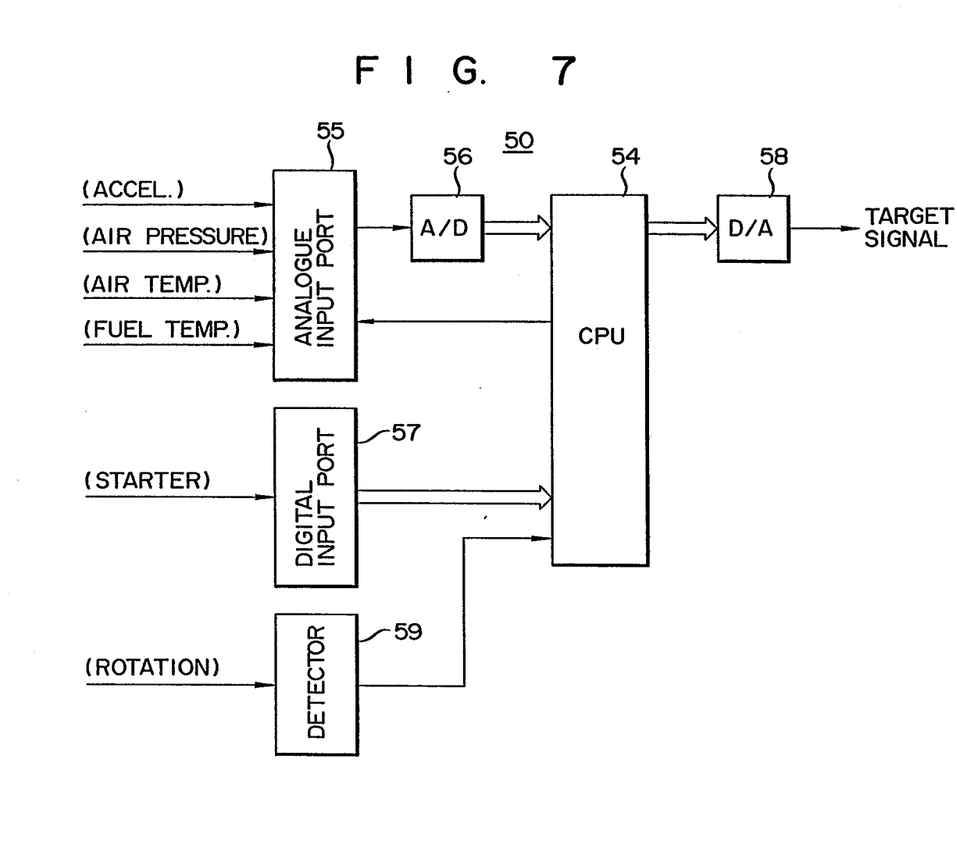
FIG. 7 is a block diagram for explaining the data-processing portion of the control circuit.

FIG. 7 is a view for explaining data processor 50 in more detail. Processor 50 comprises central processing unit (CPU) 54. CPU 54 comprises a one-chip microcomputer which includes a ROM for storing a control program, control parameters, and the like; and a RAM for temporarily storing control data, produced upon calculations performed in accordance with the control program, and the like. CPU 54 fetches the detection signals, such as the accelerator position signal, the intake air pressure signal, the intake air temperature signal, the fuel temperature signal, and the like, in an analog state, via analog input port 55. These analogue input signals are converted into digital data by A/D converter 56, and are then input to CPU 54. A start signal, produced in response to the ON state of a key-switch signal, is input to CPU 54 via digital input port 57. A rotation signal is input to CPU 54 via detector 59.

CPU 54 calculates a target value corresponding to an optimal fuel injection quantity suited for the engine conditions at that time, in accordance with the various detection signals, and outputs the calculated result in the form of digital data. The output data is converted into an analogue target position signal by D/A converter 58, and is supplied to actuator servo 51.

In the above embodiment, a Bosch-type fuel injection pump is used. However, the present invention can be applied to control a distributor-type fuel injection pump. In the above embodiment, a magnetic linear solenoid structure has been exemplified as an actuator for performing control of the amount of fuel to be supplied to the injection pump. As the actuator mechanism, a DC motor, a linear motor, a stepping motor, a hydraulic piston mechanism, and the like are appropriately used. The position sensor can be constituted by a potentiometer and the like.

As a means for interlocking position sensor 24 and control rack 11 which is moved together with the fuel injection quantity control member 42, single tie bar 20 supported by single support shaft 22 is used in the above embodiment. However, a coupling means for interlocking the control rack and the position sensor can be constituted by a plurality of support shafts and link mechanisms.

What is claimed is:

1. A speed-governing apparatus for an internal combustion engine, comprising:
   fuel injection quantity control means for controlling a quantity of fuel to be injected;
   an actuator mechanism for driving and setting the position of said fuel injection quantity control means;
   actual-position detecting means including a moveable member and a fixed member for generatifng a signal representing said quantity of fuel to be injected which corresponds to a detected position of said fuel injection quantity control means;
   coupling means which has opposite ends connected to said fuel injection quantity control means and said moveable member of said actual-position detecting means, respectively, such that a relative positional relationship between said fuel injection quantity control means and said moveable member of said actual-position detecting means exists and said moveable member can be moved to a position correspondidng to the position of said fuel injection quantity control means;
   reference postion-setting means for setting a reference position of said coupling means, thereby setting said relative positional relationship between said fuel injection quantity control means and said moveable member of said actual-position detection means;
   correcting means for correcting and fixing in a corrected position the reference position of said reference position-setting means by adjusting said reference position and thereby moving said moveable member to correct the relative positional relationship of said fuel injection quantity control means and said moveable member of said actual-position detecting means; and
   control means for receiving said actual injection quantity signal, calculating an optimal quantity of fuel to be injected and feedback controlling said actuator mechanism on the basis of the calculated result.

2. An apparatus according to claim 1, further comprising:
   a housing in which said fuel injection quantity control means, said actual-position detecting means, said coupling means, said reference position-setting means, and said correcting means are housed.

3. An apparatus according to claim 2, wherein said coupling means comprises a tie bar which is pivotally coupled to said fuel injection quantity control means and said actual-position detecting means, respectively, and said tie bar is pivotally supported by a support shaft which is positioned by said reference position-setting means.

4. An apparatus according to claim 2, wherein said reference position-setting means comprises a support shaft which pivotally supports said coupling means, and the position of said support shaft is adjusted and fixed by said correcting means.

5. An apparatus according to claim 2, wherein a portion of said correcting means extends outside said housing, so that a correcting operation is performed outside said housing, and the correcting position is set.

6. An apparatus according to claim 2, wherein said coupling means comprises a tie bar for coupling said fuel injection quantity control means and said actual-position detecting means, and said reference position-setting means comprises a support shaft for pivotally supporting said tie bar, the position of said support shaft being changed by said correcting means.

7. An apparatus according to claim 6, wherein said correcting means comprises a control member for supporting said support shaft, so that said support shaft is moved by said control member along a specific arc, and a portion of said control member extends outside said housing, so that said control member can be operated outside said housing, so as to change the position of said support shaft.

8. An apparatus according to claim 2, wherein, said correcting means comprises a columnar control member having a central axis which extends through said housing and said reference position-setting means projects from an end face portion of said control member inside said housing at a position different from and parallel to the central axis of said control member.

9. An apparatus according to claim 2, wherein said correcting means includes:
   a columnar control member having a central axis which extends through said housing, said reference position-setting means projects from an end face portion of said control member inside said housing at a position different from and parallel to the central axis of said control member and;
   an actuating member which extends along a lateral direction of said control member and is mounted on another portion of said control member outside said housing so that said actuating member is pivoted about said control member and the pivot position of said actuating member is selectively fixed.

10. An apparatus according to claim 9, wherein said actuating member comprises a member which has an arcuated opening having the central axis of said control member as its center and a fixing screw is inserted in said opening, to be screwed into said housing.

11. An apparatus according to claim 9, wherein said reference position-setting means comprises a support shaft which projects from an end face portion of said control member inside said housing at a position different from the central axis of said control member, said support shaft pivotally supports said coupling means and the reference position of said coupling means is set by said support shaft.

12. An apparatus according to claim 1, wherein said actual-position detecting means includes a core which is formed of a magnetic material moved by said coupling means and an induction coil for detecting an electrical signal corresponding to a position of said core.

13. An apparatus according to claim 1, wherein said fuel injection quantity control means includes a control rack which is moved linearly, and said control rack is driven by said actuator mechanism, said actuator mechanism being set upon instruction from said control means.

14. An apparatus according to claim 13, wherein said actuator mechanism includes a stator core and a moving core for driving said control rack and said moving core is moved to a position corresponding to an excitation current flowing through an excitation coil, the excitation current being set in correspondence with an instruction from said control means.

15. An apparatus according to claim 1, wherein said control means calculates the optimal amount of fuel to be injected in accordance with input signals consisting of detection signals relating to prevailing engine conditions, such as intake air amount, a rotating speed of the internal combustion engine, and wherein a target fuel injection quantity obtained by means of the calculation, and an actual fuel injection quantity obtained from said actual-position detecting means are compared, in order to calculate a signal for controlling said actuator mechanism.

16. An apparatus according to claim 1, wherein said fuel injection quantity control means controls an injection pump for controlling an amount of fuel to be supplied to a diesel engine.

* * * * *

UNITED STATES PATENT AND TRADEMARK OFFICE
CERTIFICATE OF CORRECTION

PATENT NO. : 4,757,791

DATED : July 19, 1988

INVENTOR(S) : Shuji Hachitani; Hidetoshi Doshita

It is certified that error appears in the above-identified patent and that said Letters Patent is hereby corrected as shown below:

ON THE FIRST INFORMATION PAGE:

(73) Assignee name should read as follow:

-- Nippondenso Co., Ltd. --

Signed and Sealed this

Twenty-third Day of May, 1989

Attest:

DONALD J. QUIGG

Attesting Officer

Commissioner of Patents and Trademarks